United States Patent
Yang

(10) Patent No.: US 11,910,195 B2
(45) Date of Patent: Feb. 20, 2024

(54) METHOD OF INTEGRITY CHECK, TERMINAL, AND NETWORK-SIDE EQUIPMENT

(71) Applicant: VIVO MOBILE COMMUNICATION CO., LTD., Chang'an Dongguan (CN)

(72) Inventor: Xiaodong Yang, Chang'an Dongguan (CN)

(73) Assignee: Vivo Mobile Communication Co., Ltd., Dongguan (CN)

( * ) Notice: Subject to any disclaimer, the term of this patent is extended or adjusted under 35 U.S.C. 154(b) by 661 days.

(21) Appl. No.: 16/608,276

(22) PCT Filed: Apr. 27, 2018

(86) PCT No.: PCT/CN2018/084820
§ 371 (c)(1),
(2) Date: Oct. 25, 2019

(87) PCT Pub. No.: WO2018/196852
PCT Pub. Date: Nov. 1, 2018

(65) Prior Publication Data
US 2020/0092726 A1 Mar. 19, 2020

(30) Foreign Application Priority Data
Apr. 28, 2017 (CN) .......................... 201710297656.8

(51) Int. Cl.
*H04W 12/106* (2021.01)
*H04W 76/30* (2018.01)
(Continued)

(52) U.S. Cl.
CPC .......... *H04W 12/106* (2021.01); *H04L 41/06* (2013.01); *H04L 63/123* (2013.01);
(Continued)

(58) Field of Classification Search
None
See application file for complete search history.

(56) References Cited

U.S. PATENT DOCUMENTS

| | | | |
|---|---|---|---|
| 2011/0188408 A1* | 8/2011 | Yi | H04W 28/06 370/254 |
| 2012/0182929 A1 | 7/2012 | Chen et al. | |

(Continued)

FOREIGN PATENT DOCUMENTS

| | | |
|---|---|---|
| CN | 101111033 A | 1/2008 |
| CN | 102149088 A | 8/2011 |

(Continued)

OTHER PUBLICATIONS

1st Chinese Office Action for Chinese Application No. 201710297656.8, dated Jun. 5, 2019 (dated Jun. 5, 2019)—12 pages (English translation—16 pages).

(Continued)

*Primary Examiner* — Alex Skripnikov
(74) *Attorney, Agent, or Firm* — Culhane Meadows PLLC; Stephen J. Weed

(57) ABSTRACT

A method of integrity check, a terminal, and network-side equipment are provided. The method includes: receiving, by the terminal, user plane data transmitted by the network-side equipment; performing, by the terminal, integrity check on the user plane data based on user-plane-data integrity check configuration information.

11 Claims, 5 Drawing Sheets

(51) Int. Cl.
  *H04W 76/27* (2018.01)
  *H04L 41/06* (2022.01)
  *H04L 9/40* (2022.01)
  *H04W 68/00* (2009.01)
  *H04W 12/102* (2021.01)
  *H04W 80/02* (2009.01)
  *H04W 88/06* (2009.01)

(52) U.S. Cl.
  CPC ....... *H04W 12/102* (2021.01); *H04W 68/005* (2013.01); *H04W 76/27* (2018.02); *H04W 76/30* (2018.02); *H04W 80/02* (2013.01); *H04W 88/06* (2013.01)

(56) References Cited

U.S. PATENT DOCUMENTS

| | | | |
|---|---|---|---|
| 2012/0307709 A1 | 12/2012 | Östergaard et al. | |
| 2014/0293903 A1* | 10/2014 | Kuo | H04W 24/02 370/328 |
| 2016/0374104 A1* | 12/2016 | Watfa | H04W 36/0011 |
| 2017/0005795 A1 | 1/2017 | Gan et al. | |
| 2017/0156060 A1* | 6/2017 | Wu | H04W 12/041 |
| 2018/0213403 A1 | 7/2018 | Shi | |
| 2019/0327607 A1* | 10/2019 | Xiao | H04L 5/0053 |

FOREIGN PATENT DOCUMENTS

| | | | | |
|---|---|---|---|---|
| CN | 102158901 A | | 8/2011 | |
| CN | 102547687 A | | 7/2012 | |
| CN | 102740414 A | | 10/2012 | |
| CN | 103188681 A | | 7/2013 | |
| CN | 103314548 A | | 9/2013 | |
| CN | 103458475 A | | 12/2013 | |
| CN | 103781130 A | | 5/2014 | |
| CN | 104936169 A | * | 9/2015 | ............ H04W 12/00 |
| CN | 106375989 A | | 2/2017 | |
| EP | 2528369 A1 | | 11/2012 | |
| EP | 2770796 A2 | * | 8/2014 | ............ H04W 12/04 |
| IN | 102142942 A | | 8/2011 | |
| WO | WO-2015015300 A2 | * | 2/2015 | ............ H04L 63/205 |

OTHER PUBLICATIONS

Chinese Search Report for Chinese Application No. 201710297656.8, dated Apr. 15, 2019 (dated Apr. 15, 2019)—5 pages (English translation—3 pages).

Extended European Search Report for European Application No. 18791933.7, dated Jan. 16, 2020 (dated Jan. 16, 2020)—7 pages.

International Search Report and Written Opinion for International Application No. PCT/CN2018/084820, dated Nov. 7, 2019 (dated Nov. 7, 2019)—10 pages (English translation—7 pages).

* cited by examiner

METHOD OF INTEGRITY CHECK, TERMINAL, AND NETWORK-SIDE EQUIPMENT

CROSS-REFERENCE TO RELATED APPLICATION

The present application is a U.S. national phase application of a PCT Application No. PCT/CN2018/084820 filed on Apr. 27, 2018, which claims a priority of the Chinese patent application No. 201710297656.8 filed in China on Apr. 28, 2017, a disclosure of which is incorporated herein by reference in its entirety.

TECHNICAL FIELD

The present disclosure relates to wireless communication technology, in particular to a method of integrity check, a terminal, and network-side equipment.

BACKGROUND

Currently, in the field of wireless communication, with increased demand on communication security, it has become increasingly important to enhance security measures during communication. Security measures applied in conventional communication systems mainly include authentication, encryption, and integrity check.

In a Long Term Evolution (LTE) system, a radio resource control (RRC) message is encrypted prior to transmission. Meanwhile, an integrity check is further performed on the RRC message to prevent data tampering.

However, in an LTE system, during transmission and reception of user plane data, only encryption and decryption are performed on the user plane data, thereby security of the user plane data cannot be guaranteed.

SUMMARY

Embodiment of the present disclosure provide a method of integrity check, a terminal, and network-side equipment to improve the security of user plane data.

In a first aspect, an embodiment of the present disclosure provides a method of integrity check, including: receiving, by a terminal, user plane data transmitted by network-side equipment; performing, by the terminal, an integrity check on the user plane data based on user-plane-data integrity check configuration information.

In a second aspect, an embodiment of the present disclosure provides a method of integrity check, including: transmitting, by network-side equipment, user-plane-data integrity check configuration information to a terminal, where the user-plane-data integrity check configuration information is configured to instruct the terminal to perform an integrity check on the user plane data received from the network-side equipment; and transmitting, by the network-side equipment, the user plane data to the terminal.

In a third aspect, an embodiment of the present disclosure provides a terminal, including: a data reception module, configured to receive user plane data transmitted by the network-side equipment; and an integrity check module, configured to perform an integrity check on the user plane data based on user-plane-data integrity check configuration information.

In a fourth aspect, an embodiment of the present disclosure provides network-side equipment, including: a configuration information transmission module, configured to transmit user-plane-data integrity check configuration information to a terminal, where the user-plane-data integrity check configuration information is configured to instruct the terminal to perform an integrity check on the user plane data received from the network-side equipment; and a data transmission module, configured to transmit the user plane data to the terminal.

In a fifth aspect, an embodiment of the present disclosure provides a terminal, including: a processor, a storage, and a computer program stored in the storage and configured to be executed by the processor, where the processor is configured to execute the computer program, to implement the steps of the method of integrity check described in the first aspect.

In a sixth aspect, an embodiment of the present disclosure provides network-side equipment, including: a processor, a storage, and a computer program stored in the storage and configured to be executed by the processor, where the processor is configured to execute the computer program, to implement the steps of the method of integrity check described in the second aspect.

In a seventh aspect, an embodiment of the present disclosure provides a computer-readable storage medium having a computer program stored therein, where the computer program is configured to be executed by a processor, to implement the steps of the method of integrity check described in the first or second aspect.

With the method of integrity check, terminal, and network-side equipment provided by embodiments of the present disclosure, having received user plane data transmitted by the network-side equipment, the terminal performs an integrity check on the user plane data received from the network-side equipment based on the user-plane-data integrity check configuration information, so as to determine whether the user plane data is tampered, thereby improving security of the user plane data.

BRIEF DESCRIPTION OF THE DRAWINGS

To describe the technical solutions of the present disclosure or in the related art more clearly, the accompanying drawings required for describing the embodiments or related art are briefly described hereinafter. Apparently, the drawings accompanying the following description show only some embodiments of the present disclosure, and a person of ordinary skill in the art can derive other drawings from these accompanying drawings without creative efforts.

DETAILED DESCRIPTION

To make the objective, technical solutions, and advantages of the present disclosure more clear, the technical solutions in embodiments of this disclosure are described clearly and completely in conjunction with drawings in the embodiments of this disclosure. Apparently, the described embodiments are merely a part of rather than all the embodiments of this disclosure. All other embodiments obtained by a person ordinary skilled in the art based on the embodiments of this disclosure without any creative efforts fall within the protection scope of this disclosure.

Terms "comprise," "include," "have," and any variations thereof in the specification and claims of the present disclosure are intended to cover a non-exclusive inclusion meaning, such that a process, a method, a system, a product, or a device that includes a series of steps or units not only includes the steps or units listed expressly, but also may include other steps or units not expressly listed or include steps or units inherent to the process, the method, the product, or the device.

Figure 1:
FIG. 1 is a schematic view of a system architecture for a method of integrity check provided by the present disclosure.

FIG. 1 is a first schematic view of a system architecture for a method of integrity check provided by the present disclosure. As shown in FIG. 1, the system architecture provided by this embodiment includes network-side equipment and a terminal.

The network-side equipment may be a base transceiver station (BTS) in a global system of mobile communication (GSM) or a code division multiple access (CDMA) system, or a NodeB (NB) in a wideband code division multiple access (WCDMA) system, or an evolutional Node B (eNB or eNodeB) in an LTE system, or a base station in a new radio access technical (New RAT or NR) system, or a relay station or access point, or a base station in a future 5G network, or the like, and is not limited herein.

The terminal may be a wireless terminal or a wired terminal. A wireless terminal may refer to a device used to provide voice and/or other service data connectivity to a user, a hand-held device with a wireless connection function, or another processing device connected to a wireless modem. A wireless terminal may communicate with one or more core networks via a radio access network (RAN). The wireless terminal may be a mobile terminal, such as a mobile phone (also called cellphone) or a computer equipped with a mobile terminal, such as a portable, pocket-sized, hand-held, computer built-in, or vehicle-mounted mobile device, which exchanges voice and/or data with the radio access network. For example, it may be a personal communication service (PCS) phone, a cordless phone, a session initiation protocol (SIP) phone, a wireless local loop (WLL) station, a personal digital assistant (PDA), or the like. A wireless terminal may also be referred to as a system, a subscriber unit, a subscriber station, a mobile station, a mobile, a remote station, a remote terminal, an access terminal, a user terminal, a user agent, or a user device or user equipment, and is not limited herein.

Figure 2:
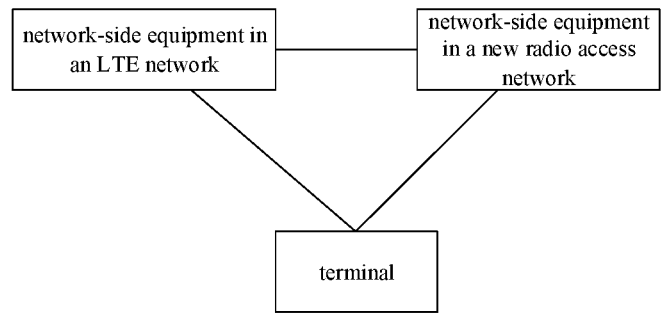
FIG. 2 is a schematic view of a system architecture for a method of integrity check provided by the present disclosure.

FIG. 2 is a second schematic view of a system architecture for a method of integrity check provided by the present disclosure. The system architecture shown in FIG. 1 is a single connectivity communication system. The system architecture in FIG. 2 is a multi-connectivity communication system on the basis of the embodiment shown in FIG. 1. The multi-connectivity communication system may be, for example, a dual connectivity (DC) communication system.

The dual connectivity communication system refers to a system in which the terminal has access to both first network-side equipment and second network-side equipment. In this embodiment, the first network-side equipment may be one of the network-side equipment described in the embodiment of FIG. 1, and the second network-side equipment may be one of the network-side equipment described in the embodiment of FIG. 1. In a possible implementation, as shown in FIG. 2, the dual connectivity communication system includes network-side equipment in an LTE network and network-side equipment in an NR network. One of the systems, for example, the network-side equipment in the LTE network in this embodiment, acts as a master node (MN), and the other system, for example, the network-side equipment in the NR network in this embodiment, acts as a secondary node (SN). In the dual connectivity system, there are two cell groups, namely, a master cell group (MCG) and a secondary cell group (SCG). The master cell group may include a primary cell (PCell) and one or more secondary cells (SCell). The secondary cell group may include a primary secondary cell (PSCell) and one or more SCells. The master node corresponds to the primary cell and the secondary cell, and the secondary node corresponds to the primary secondary cell and the secondary cell. For specific implementation of the terminal, refer to the description of the embodiment shown in FIG. 1, and it will not be described again here in this embodiment.

Although a possible system architecture has been presented in the embodiment described above, the specific system architecture is not particularly limited in this embodiment, and any system architecture including a terminal and network-side equipment can be applied in this embodiment.

In a future 5th Generation (5G) mobile communication system, to support various services such as enhanced mobile broadband (eMBB) and ultra-reliable low latency communication (URLLC), merely considering the security of control plane data cannot satisfy the security demand, and the security of user plane data should also be taken into account. As such, the present disclosure provides a method of integrity check of user plane data, to ensure the security of the user plane data. Detailed description will be made of the method provided by the present disclosure with reference to specific embodiments.

Figure 3:
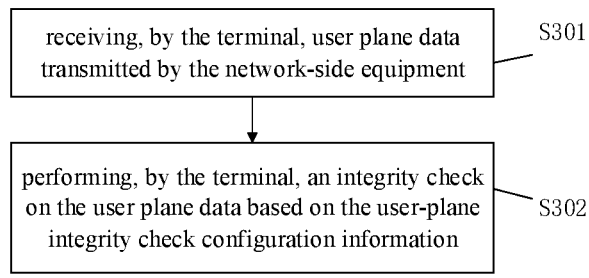
FIG. 3 is a schematic flow diagram of a method of integrity check provided by an embodiment of the present disclosure.

FIG. 3 is a schematic flow diagram of a method of integrity check provided by an embodiment of the present disclosure. This example is implemented by a terminal. As shown in FIG. 3, the method includes the following steps.

S301: receiving, by the terminal, user plane data transmitted by the network-side equipment.

Upon start-up, the terminal selects a suitable cell from a selected public land mobile network (PLMN) to camp on. After camping on a certain cell, the terminal may receive a system message and a cell broadcast message. When the terminal needs to carry out service communication, it establishes a radio resource control (RRC) connection with network-side equipment. After establishment of the RRC connection, the terminal may exchange user plane data with the network-side equipment.

In this embodiment, a possible process of RRC connection establishment is presented. This process of RRC connection establishment is implemented via a radio bearer (RB). The RB includes a signaling radio bearer (SRB) and a data radio bearer (DRB). The SRB is a transmission channel for system signaling messages, and the DRB is the transmission channel for user plane data. The SRB includes SRB0, SRB1 and SRB2, the SRB0 is configured to carry RRC messages, the SRB1 is configured to carry RRC messages and some non-access stratum (NAS) messages, and the SRB2 is configured to carry some NAS messages.

To speak in a popular and easy-to-understand manner, the RRC connection refers to the SRB1 established between the terminal and the network-side equipment, since it is not necessary to establish the SRB0. The terminal may acquire configuration and resources of the SRB0 in an idle status. A service initiation process in the system is as follows: signaling is transmitted over the SRB0 to establish the SRB1, once the SRB1 is established, the terminal enters an RRC connection status; then signaling is transmitted over the SRB1 to establish the SRB2 for transmission of NAS signaling; and signaling is transmitted over the SRB1 to establish the DRB for transmission of user plane data. It can be seen that after the DRB is established between the terminal and the network-side equipment, the terminal receives user plane data transmitted by the network-side equipment over the established DRB.

S302: performing, by the terminal, an integrity check on the user plane data based on the user-plane-data integrity check configuration information.

Have received the user plane data, the terminal performs the integrity check on the user plane data based on the user-plane-data integrity check configuration information in a targeted and specific manner. The user-plane-data integrity check configuration information may be agreed upon in advance by the terminal and the network-side equipment, or configured for the terminal by the network-side equipment. The user-plane-data integrity check configuration information may instruct the terminal to perform the integrity check on all or some of the user plane data received. The user-plane-data integrity check configuration information may further include indication information configured to indicate an integrity check algorithm corresponding to the integrity check performed by the terminal on the user plane data, etc. The indication information may be referred to as fourth indication information herein, so as to be distinguished from first, second, and third indication information in the embodiments below.

The integrity check algorithm may be, for example, an advanced encryption standard (AES) algorithm, a SNOW 3G algorithm, a ZUC algorithm, or the like, and the specific algorithm is not particularly limited here in this embodiment.

As appreciated by those skilled in the art, various parameters and information related to the integrity check may be included in the user-plane-data integrity check configuration information.

An exemplary process of integrity check performed on the user plane data by the terminal may be as follows. The terminal uses the parameters carried in the user plane data and the known parameters maintained by the terminal to generate integrity verification information by using an integrity protection algorithm, and compares the integrity verification information with known integrity verification information. If the two are consistent with each other, then the verification succeeds, and it is determined that the data are not tampered. If the two are not consistent with each other, the verification fails, i.e., the user plane data is found tampered, and it is determined that data integrity check has failed and the data is unusable. As appreciated by those skilled in the art, one integrity check process is presented herein only as an example, and other forms of integrity check processes may be applied in the embodiments of the present disclosure as well.

In some optional embodiments, the integrity check operation performed on the user plane data by the terminal is implemented at the packet data convergence protocol (PDCP) layer of the terminal.

According to the method of integrity check provided by an embodiment of the present disclosure, after receiving the user plane data transmitted by the network-side equipment, the terminal performs the integrity check on the user plane data received from the network-side equipment based on the user-plane-data integrity check configuration information, and then determines whether the user plane data has been tampered, thereby improving the security of the user plane data.

Figure 4:
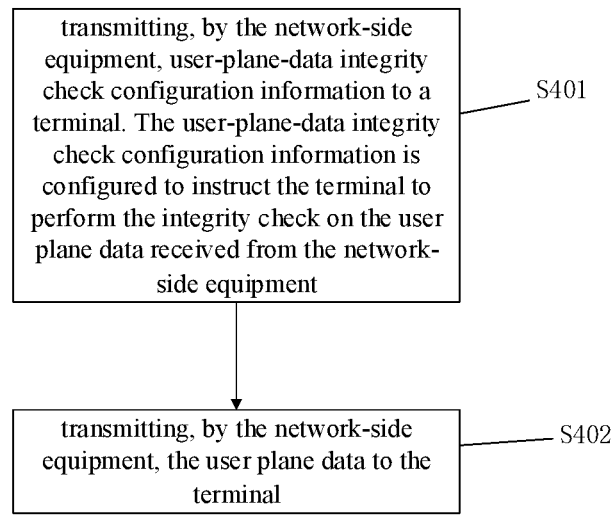
FIG. 4 is a schematic flow diagram of a method of integrity check provided by an embodiment of the present disclosure.

FIG. 4 is a schematic flow diagram of a method of integrity check provided by an embodiment of the present disclosure. This example is implemented by network-side equipment, which may be the network-side equipment as shown in FIG. 1 or any one of the network-side equipment in the multi-connectivity system as shown in FIG. 2. Corresponding to FIG. 3, this embodiment is implemented by the network-side equipment. As shown in FIG. 4, this method includes the following steps.

S401: transmitting, by the network-side equipment, user-plane-data integrity check configuration information to a terminal. The user-plane-data integrity check configuration information is configured to instruct the terminal to perform integrity check on the user plane data received from the network-side equipment.

S402: transmitting, by the network-side equipment, the user plane data to the terminal.

Corresponding to the embodiment shown in FIG. 3 in which the user-plane-data integrity check configuration information is configured for the terminal by the network-side equipment, the network-side equipment may firstly transmit the user-plane-data integrity check configuration information to the terminal before transmitting the user plane data to the terminal. In some optional embodiments, the user-plane-data integrity check configuration information may be newly added information, or extension fields added to the RRC message during RRC establishment, or information carried in the reconfiguration message during RRC reconfiguration. In this embodiment, the specific process of transmitting the user-plane-data integrity check configuration information to the terminal by the network-side equipment is not particularly limited. After the DRB is established between the network-side equipment and the terminal, the network-side equipment transmits the user plane data to the terminal over the DRB, and the terminal performs the integrity check on the user plane data.

According to the method of integrity check provided by this embodiment, the network-side equipment transmits the user-plane-data integrity check configuration information to the terminal, to instruct the terminal to perform the integrity check on the user plane data received from the network-side equipment. After the network-side equipment transmits the user plane data to the terminal, the terminal performs the integrity check on the user plane data by using the userplane-data integrity check configuration information. By means of the integrity check, the terminal may determine whether the user plane data has been tampered, thereby improving the security of the user plane data.

Detailed description will be made hereinafter of the method of integrity check provided by the present disclosure with reference to a specific embodiment.

In a specific example, on the basis of the embodiments shown in FIG. 3 and FIG. 4, the user-plane-data integrity check configuration information includes first indication information configured to indicate a DRB corresponding to the integrity check. A specific implementation process of a corresponding method of integrity check may be as shown in FIG. 5.

Figure 5:
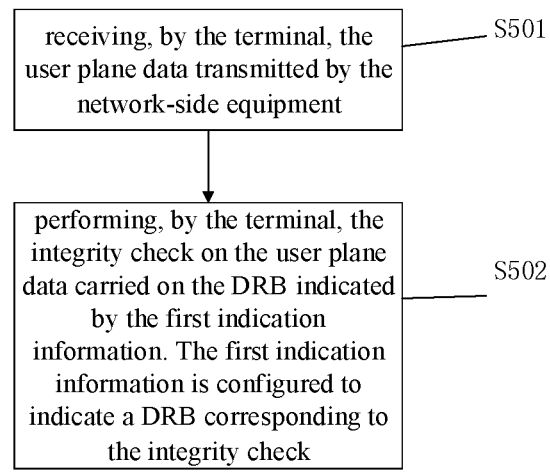
FIG. 5 is a flow diagram of a method of integrity check provided by an embodiment of the present disclosure.

FIG. 5 is a flow diagram of a method of integrity check provided by an embodiment of the present disclosure. As shown in FIG. 5, the method includes: S501, receiving, by the terminal, the user plane data transmitted by the network-side equipment; S502, performing, by the terminal, the integrity check on the user plane data carried on the DRB indicated by the first indication information, and the first indication information is configured to indicate a DRB corresponding to the integrity check.

Specifically, there is only one type of DRB and the protocol provides that each terminal may use up to 8 DRBs to transmit different services. The terminal may perform the integrity check on either all of the DRBs or some of the DRBs. Specifically, the first indication information indicates an identifier of the DRB on which the integrity check requires to be performed. The identifier of the DRB may be, for example, a value of the DRB, a sequence number of the DRB, etc. The identifier of the DRB is not particularly limited in this embodiment. Specifically, the identifier of the DRB on which the integrity check is to be performed may be indicated according to the importance of the user plane data carried on the DRB.

The terminal may perform the integrity check on the user plane data carried on the DRB indicated by the first indication information. That is, the terminal may perform the integrity check on the user plane data carried on a specific DRB purposefully. In this way, the integrity check efficiency of the terminal is improved, while demand on the capacity of the terminal is lowered and power consumption of the terminal is also reduced.

In some optional embodiments, on the basis of this embodiment, the terminal may determine whether data integrity check has failed according to a first determination criterion as to whether the user plane data fails the integrity check. The first determination criterion as to whether the user plane data fails the integrity check may be configured in the user-plane-data integrity check configuration information, agreed upon in advance by the terminal and the network-side equipment, transmitted to the terminal by the network-side equipment, or set by the terminal itself. The configuration mode of the first determination criterion as to the failure of the integrity check is not particularly limited in this embodiment.

Specifically, the first determination criterion as to the failure of the integrity check includes: if at least one of the DRBs indicated by the first indication information fails the integrity check, the user plane data fails the integrity check.

During a specific implementation, if the terminal determines that the user plane data carried on at least one of the DRBs indicated by the first indication information fails the integrity check, then the terminal determines that the user plane data fails the integrity check. It can be seen from above, identifiers of multiple DRBs may be indicated in the first indication information, and the user plane data are transmitted between the network-side equipment and the terminal over multiple DRBs. The terminal may determine that the user plane data fails the integrity check when it is determined that one or more of the DRBs or all of the indicated DRBs fail the integrity check.

That the terminal determines the user plane data carried on the DRB fails the integrity check has the following possible implementations.

In a possible implementation, if at least one of data packets carried on the DRB fails the integrity check, then the user plane data carried on the DRB fails the integrity check.

Specifically, multiple data packets may be carried on the DRB. When one or more data packets carried on the DRB fail the integrity check, the terminal determines that the DRB fails the integrity check. The number of the data packets which fail the integrity check may be agreed upon in advance or set by the terminal itself.

In another possible implementation, if a ratio of the number of data packets carried on the DRB that fail the integrity check to the number of received data packets carried on the DRB exceeds a preset threshold, then it is determined that the user plane data carried on the DRB fails the integrity check.

Specifically, the terminal performs the integrity check consecutively on the received data packets carried on the DRB, counts the data packets which fail the integrity check, and counts the received data packets carried on the DRB. When a ratio of the number N of data packets which fail the integrity check to the number M of received data packets carried on the DRB exceeds the preset threshold, i.e., the ratio N/M exceeds the preset threshold, then it is determined that the user plane data carried on the DRB fails the integrity check.

In yet another possible implementation, if the number of data packets carried on the DRB that fail the integrity check exceeds a preset number, then it is determined that the user plane data carried on the DRB fails the integrity check.

Specifically, the terminal performs the integrity check consecutively on the received data packets carried on the DRB, and counts the data packets which fail the integrity check. When the number of data packets which fail the integrity check exceeds the preset threshold, then the terminal determines that the user plane data carried on the DRB fails the integrity check.

In still another possible implementation, if the number of data packets carried on the DRB that fail the integrity check exceeds a preset number in a preset duration, then it is determined that the user plane data carried on the DRB fails the integrity check.

Specifically, in the preset duration, the data packets which fail the integrity check are counted. If the number of data packets carried on the DRB that fail the integrity check exceeds the preset number, then the terminal determines that the user plane data carried on the DRB fails the integrity check.

In still another possible implementation, if the number of consecutive data packets carried on the DRB that fail the integrity check exceeds a preset number, then it is determined that the user plane data carried on the DRB fails the integrity check.

Specifically, the consecutive data packets which fail the integrity check are counted. If the counted number exceeds the preset number, then the terminal determines that the user plane data carried on the DRB fails the integrity check.

In another specific example, on the basis of the embodiments shown in FIG. 3 and FIG. 4, the user-plane-data integrity check configuration information includes second indication information configured to instruct the terminal to perform the integrity check on all the user plane data received. The specific implementation process of the corresponding method of integrity check may be as shown in FIG. 6.

Figure 6:
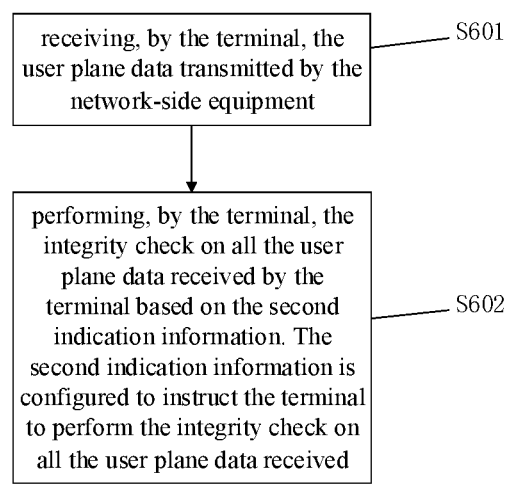
FIG. 6 is a flow diagram of a method of integrity check provided by an embodiment of the present disclosure.

FIG. 6 is a flow diagram of a method of integrity check provided by an embodiment of the present disclosure. As shown in FIG. 6, the method includes: S601, receiving, by the terminal, the user plane data transmitted by the network-side equipment; and S602, performing, by the terminal, the integrity check on all the user plane data received by the terminal based on the second indication information. The second indication information is configured to instruct the terminal to perform the integrity check on all the user plane data received.

Specifically, the terminal may be instructed at the terminal level. That is, the terminal performs the integrity check on all the user plane data, regardless of which DRB the data packet in the user plane data belongs to.

In this embodiment, the user-plane integrity configuration information may further include a second determination criterion as to whether the user plane data fails the integrity check. In some optional embodiments, on the basis of this embodiment, the terminal may determine whether data integrity check has failed based on the second determination criterion as to whether the user plane data fails the integrity check. The second determination criterion as to whether the user plane data fails the integrity check may be configured in the user-plane-data integrity check configuration information, agreed upon in advance by the terminal and the network-side equipment, transmitted to the terminal by the network-side equipment, or set by the terminal itself. In this embodiment, the configuration mode of the second determination criterion as to the failure of the integrity check is not particularly limited.

Specifically, the second determination criterion as to the failure of the integrity check includes: if at least one of the data packets of the user plane data fails the integrity check, then the user plane data fails the integrity check; or if a ratio of the number of data packets of the user plane data that fail the integrity check to the number of received data packet exceeds a preset threshold, then the user plane data fails the integrity check; or if the number of data packets of the user plane data that fail the integrity check exceeds a preset number, then the user plane data fails the integrity check; or if the number of data packets of the user plane data that fail the integrity check exceeds a preset number in a preset duration, then the user plane data fails the integrity check; or if the number of consecutive data packets of the user plane data that fail the integrity check exceeds a preset number, then the user plane data fails the integrity check.

In this embodiment, the terminal performs the integrity check on all the user plane data received. For the specific implementation process of the counting of the data packets or the number of the data packets, refer to the embodiment shown in FIG. 5. A repeated A repeated description is omitted is omitted in this embodiment.

In the embodiment described above, the data packet includes protocol data unit (PDU) and/or service data unit (SDU) of a packet data convergence protocol (PDCP) layer, a radio link control (RLC) layer, and/or a medium access control (MAC) layer.

It can be seen from above, determination of the user plane data fails the integrity check may be implemented in various modes. In a specific implementation process, the mode may be configured flexibly according to the importance of the user plane data or the capacity of the terminal.

Figure 7:
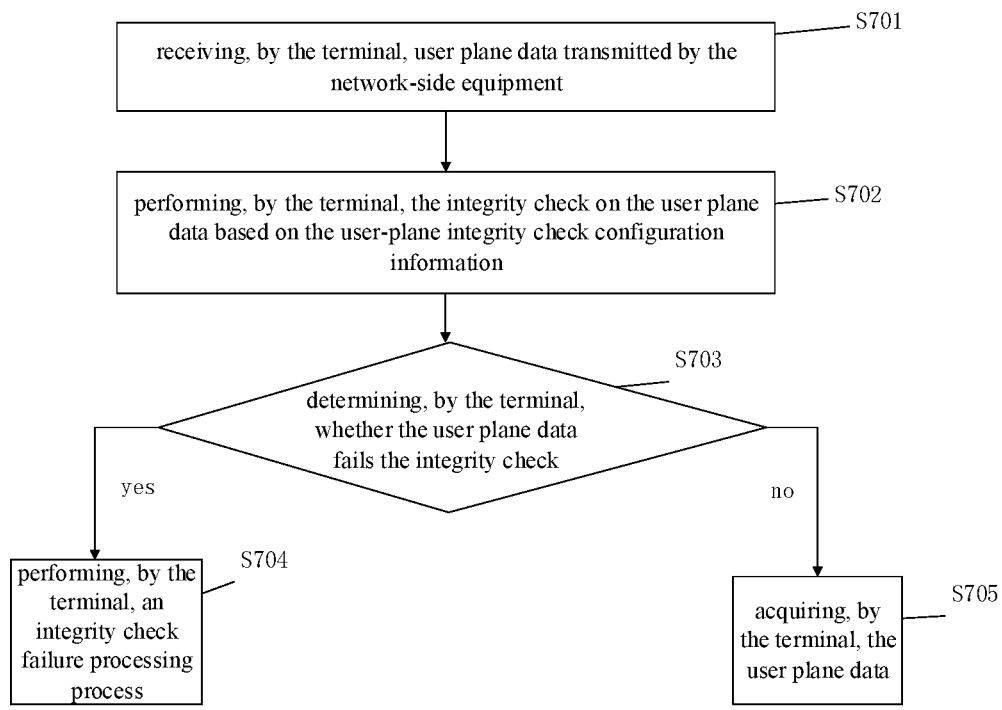
FIG. 7 is a flow diagram of a method of integrity check provided by an embodiment of the present disclosure.

On the basis of the embodiment described above, the present disclosure further specifies subsequent operations of the terminal after the failure of the integrity check, as shown specifically in FIG. 7. FIG. 7 is a flow diagram of a method of integrity check provided by an embodiment of the present disclosure. As shown in FIG. 7, the method includes: S701, receiving, by the terminal, user plane data transmitted by the network-side equipment; S702, performing, by the terminal, the integrity check on the user plane data based on the user-plane-data integrity check configuration information; S703, determining, by the terminal, whether the user plane data fails the integrity check, if so, the process proceeds to S704, otherwise, the process proceeds to S705; S704, performing, by the terminal, an integrity check failure processing process; and S705, acquiring, by the terminal, the user plane data.

For specific implementation processes of S701 to S703, refer to the embodiment described above. A repeated description is omitted in this embodiment.

The integrity check failure process may be agreed upon in advance by the terminal and the network-side equipment, set by the terminal itself, or configured for the terminal by the network-side equipment.

In this embodiment, the integrity check process performed by the terminal may have two possible implementations.

In one possible implementation, when the terminal determines that the user plane data fails the integrity check, the terminal performs the integrity check failure process. That is, the terminal performs the integrity check failure process once the integrity check fails.

In another possible implementation, before the terminal performs the integrity check, the network-side equipment transmits a failure processing activation message to the terminal. The failure processing activation message is configured to instruct the terminal to start the integrity check failure processing process upon failure of the integrity check.

That is, if the terminal hasn't received the failure processing activation message, then after the terminal determines that the user plane data fails the integrity check, the terminal will not perform the subsequent integrity check failure processing process. If the terminal has received the failure processing activation message, then after the terminal determines that the user plane data fails the integrity check, the terminal will perform the subsequent integrity check failure processing process.

In some optional embodiments, if the user plane data fails the integrity check, the terminal performs at least one of the following steps: transmitting, by the PDCP layer of the terminal, an integrity check failure notification message to the RRC layer of the terminal; discarding, by the terminal, the user plane data; transmitting, by the terminal, the integrity check failure notification message to the network-side equipment; releasing, by the terminal, the RRC connection with the network-side equipment; triggering, by the terminal, a radio link failure (RLF) mechanism; releasing, by the terminal, a DRB configuration of the network-side equipment.

As would be appreciated by those skilled in the art, the integrity check failure processing process includes at least one of the steps described above.

During a specific implementation process, the PDCP layer of the terminal performs the integrity check on the user plane data. When the user plane data fails the integrity check, the PDCP layer of the terminal transmits an integrity check failure notification message to the RRC layer and discards the user plane data.

The terminal may also transmit an integrity check failure notification message to the network-side equipment. In some optional embodiments, the integrity check failure message involved in this embodiment may carry an identifier of the DRB that fails the integrity check. During an RRC reconfiguration process, the network-side equipment may reconfigure the DRB for the terminal based on the identifier of the DRB that fails the integrity check.

The terminal may also release the RRC connection with the network-side equipment and transmit a notification message that the terminal has released the RRC connection to the network-side equipment. During a subsequent processing process, the terminal may also re-establish the RRC connection with the network-side equipment.

The terminal may also trigger a radio link failure (RLF) mechanism. After triggering the RLF mechanism, the terminal re-establishes the RRC within a specified time period. If the re-establishment fails within the specified time period, the terminal may initiate an RRC establishment request subsequently.

The terminal may also release the DRB configuration of the network-side equipment. As appreciated by those skilled in the art, the network-side equipment configures an available DRB for the terminal for user plane data transmission. Upon failure of the integrity check, the terminal may release the DRB configuration configured by the network-side equipment for the terminal.

During a specific implementation process, the integrity check failure process may be selected flexibly according to different system architectures and different scenarios.

Hereinafter, the method of integrity check provided by an embodiment of the present disclosure will be described in detail with respect to different scenarios.

In a possible application scenario as shown in FIG. 2, i.e., a multi-connectivity scenario, the user-plane-data integrity check configuration information further includes third indication information configured to instruct the terminal to perform the integrity check on the received user plane data transmitted by another network-side equipment.

For example, the network-side equipment in the LTE transmits the user-plane-data integrity check configuration information to the terminal. In some optional embodiments, the user-plane-data integrity check configuration information includes first indication information or second indication information described above. In this embodiment, the user-plane-data integrity check configuration information further includes third indication information. That is, the network-side equipment in the LTE also instructs the terminal to perform integrity check on the received user plane data transmitted by the network-side equipment in the new radio access network. The process of integrity check performed by the terminal on the user plane data of the new radio access network is the same as the process of integrity check performed by the terminal on the user plane data of the LTE.

In this process, the network-side equipment (the network-side equipment in the LTE network) transmits a configuration done notification message to the other network-side equipment (the network-side equipment in the new radio access network). The configuration done notification message is configured to notify the other network-side equipment that the user-plane-data integrity check configuration information transmitted to the terminal by the network-side equipment is applicable to the other network-side equipment. At this point, the other network-side equipment does not have to transmit the user-plane-data integrity check configuration information to the terminal.

For another possible application scenario, continue referring to FIG. 2. The terminal operates in a dual connectivity (DC) system and the network-side equipment in this embodiment is a secondary node (SN) in the DC system. If the user plane data fails the integrity check, the terminal transmits integrity check failure information to the master node (MN) in the DC system.

Specifically, after the terminal determines that the user plane data fails the integrity check, the terminal may transmit integrity check failure information to the network-side equipment and/or another network-side equipment. In case that the terminal transmits the integrity check failure information to another network-side equipment other than the network-side equipment that transmitted the user plane data to the terminal, the integrity check failure information includes the identifier of the network-side equipment.

For example, in case that the network-side equipment in the new radio access network acts as the secondary node and the network-side equipment in the LTE network acts as the master node, if the secondary node (SN) transmitted the user plane data to the terminal and the user plane data failed the integrity check performed by the terminal, then the terminal may transmit the user-plane-data integrity check failure information with the identifier of the secondary node (SN) to the master node rather than transmitting the integrity check failure information to the secondary node. At this point, the master node may disconnect from the secondary node (SN) and re-establish a connection with a new secondary node (SN).

Another possible scenario may be a multi-connectivity system as shown in FIG. 2, or a carrier aggregation (CA) scenario. In CA, two or more component carriers (CC) are aggregated to form a carrier group so as to support a larger transmission bandwidth. The carrier corresponding to the primary cell (Pcell) is referred to as a primary component carrier (PCC) or a primary carrier; and the carrier corresponding to the secondary cell (Scell) is referred to as a secondary component carrier (SCC) or a secondary carrier. This embodiment presents illustratively a scenario including a primary cell, a primary secondary cell, and a secondary cell. For other scenarios including a primary cell and/or a primary secondary cell and a secondary cell, this embodiment is also applicable.

When the terminal operates in a primary cell in a dual connectivity (DC) system or a carrier aggregation (CA) system, if the user plane data fails the integrity check, then the PDCP layer of the terminal transmits an integrity check failure notification message to the RRC layer, the terminal discards the user plane data; the terminal releases the RRC connection with the network-side equipment or triggers the radio link failure (RLF) mechanism.

When the terminal operates in a secondary cell in a dual connectivity (DC) system or a carrier aggregation (CA) system, if the user plane data fails the integrity check, then the terminal releases the data radio bearer (DRB) configuration of the secondary cell or all secondary cells, or stops using the DRB of the secondary cell or all secondary cells.

As appreciated by those skilled in the art, the primary cell is responsible for the RRC between the network-side equipment and the terminal, while the secondary cell is configured to provide additional radio resources, with no RRC communication between the secondary cell and the terminal. Therefore, when the terminal is located in the secondary cell described above, if the integrity check performed by the terminal fails, the terminal may not perform the process of releasing the RRC connection with the network-side equipment and triggering the RLF mechanism as described above.

When the terminal is performing the process of transmitting the integrity check failure notification message to the network-side equipment, and after the terminal transmits the integrity check failure notification message to the network-side equipment, the network-side equipment transmits RRC reconfiguration information to the terminal. The RRC reconfiguration message includes new user-plane-data integrity check configuration information, and the RRC reconfiguration message may also include other configuration information. There is no particular limitation in this embodiment in this respect.

As appreciated by those skilled in the art, the scenarios described above are merely exemplary, and during a specific implementation process, various combinations or derivations may be made from these scenarios to obtain other application scenarios. Such combinations or derivations will not be enumerated in this embodiment.

Figure 8:
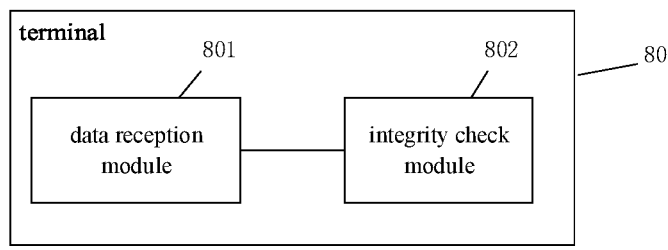
FIG. 8 is a schematic structural diagram of a terminal provided by an embodiment of the present disclosure.

FIG. 8 is a schematic structural diagram of a terminal provided by an embodiment of the present disclosure. As shown in FIG. 8, a terminal 80 includes a data reception module 801 and an integrity check module 802. The data reception module 801 is configured to receive user plane data transmitted by the network-side equipment and the integrity check module 802 is configured to perform an integrity check on the user plane data based on user-plane-data integrity check configuration information.

In some optional embodiments, the user plane data is carried on the data radio bearer (DRB). The user-plane-data integrity check configuration information includes first indication information configured to indicate a DRB corresponding to the integrity check. The integrity check module is specifically configured to perform integrity check on the user plane data carried on the DRB indicated by the first indication information.

In some optional embodiments, the integrity check module 802 is specifically configured to: if the user plane data carried on at least one of DRBs indicated by the first indication information fails the integrity check, then determine that the user plane data fails the integrity check.

In some optional embodiments, the integrity check module 802 is specifically configured to: if at least one of data packets carried on the DRB fails the integrity check, determine that the user plane data carried on the DRB fails the integrity check; or if a ratio of the number of data packets carried on the DRB that fail the integrity check to the number of received data packets carried on the DRB exceeds a preset threshold, determine that the user plane data carried on the DRB fails the integrity check; or if the number of data packets carried on the DRB that fail the integrity check exceeds a preset number, determine that the user plane data carried on the DRB fails the integrity check; or if the number of data packets carried on the DRB that fail the integrity check exceeds a preset number in a preset duration, determine that the user plane data carried on the DRB fails the integrity check; or if the number of consecutive data packets carried on the DRB that fail the integrity check exceeds a preset number, determine that the user plane data carried on the DRB fails the integrity check.

In some optional embodiments, the user-plane-data integrity check configuration information includes second indication information configured to instruct the terminal to perform the integrity check on all the user plane data received. The integrity check module 802 is specifically configured to perform the integrity check on all the user plane data received by the terminal based on the second indication information.

In some optional embodiments, the integrity check module 802 is specifically configured to: if at least one of data packets of the user plane data fails the integrity check, determine that the user plane data fails the integrity check; or if a ratio of the number of data packets of the user plane data that fail the integrity check to the number of received data packets exceeds a preset threshold, determine that the user plane data fails the integrity check; or if the number of data packets of the user plane data that fail the integrity check exceeds a preset number, determine that the user plane data fails the integrity check; or if the number of data packets of the user plane data that fail the integrity check exceeds a preset number in a preset duration, determine that the user plane data fails the integrity check; or if the number of consecutive data packets of the user plane data that fail the integrity check exceeds a preset number, determine that the user plane data fails the integrity check.

In some optional embodiments, the data packet includes protocol data unit (PDU) and/or service data unit (SDU) of a packet data convergence protocol (PDCP) layer, a radio link control (RLC) layer and/or a media access control (MAC) layer.

In some optional embodiments, the user-plane-data integrity check configuration information further includes a determination criterion as to whether the user plane data fails the integrity check.

The terminal according to this embodiment may perform the method shown in the embodiment described above and has similar implementation principles and technical effects and will not be described again here in this embodiment.

Figure 9:
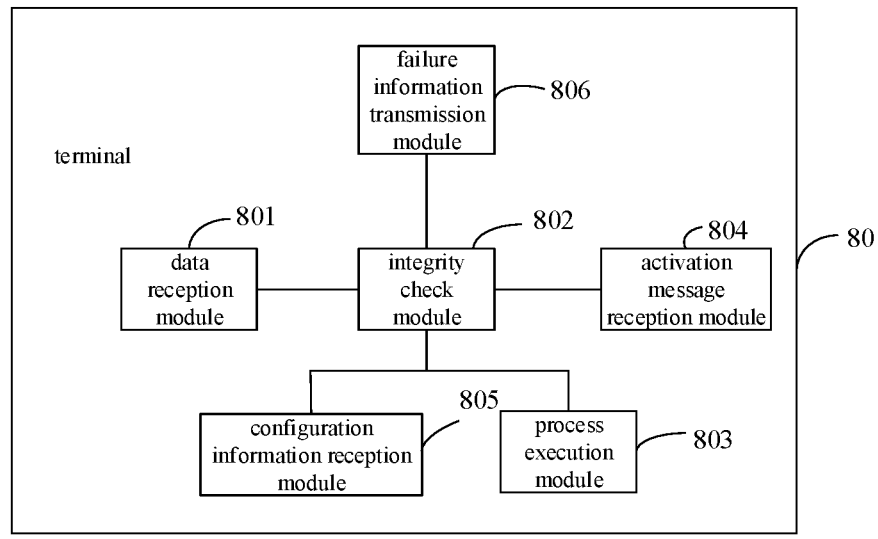
FIG. 9 is a schematic structural diagram of a terminal provided by an embodiment of the present disclosure.

FIG. 9 is a schematic structural diagram of a terminal provided by an embodiment of the present disclosure. On the basis of the embodiment shown in FIG. 8, the terminal in this embodiment further includes: a process execution module 803, an activation message reception module 804, a configuration information reception module 805, and a failure information transmission module 806. In some optional embodiments, the process execution module 803 is configured to execute at least one of the following steps if the user plane data fails the integrity check: transmitting an integrity check failure notification message to the radio resource control (RRC) layer; discarding the user plane data; transmitting the integrity check failure notification message to the network-side equipment; releasing the RRC connection with the network-side equipment; triggering a radio link failure (RLF) mechanism; releasing the DRB configuration of the network-side equipment.

In some optional embodiments, the user plane data is carried on the Data Radio Bearer (DRB) and the integrity check failure notification message includes the identifier of the DRB that fails the integrity check.

In some optional embodiments, the activation message reception module 804 is configured to: before the integrity check module performs the integrity check on the user plane data based on the user-plane-data integrity check configuration information, receive the failure processing activation message transmitted by the network-side equipment.

In some optional embodiments, the configuration information reception module 805 is configured to: before the integrity check module performs the integrity check on the user plane data based on the user-plane-data integrity check configuration information, receive the user-plane-data integrity check configuration information transmitted by the network-side equipment.

In some optional embodiments, the terminal operates in a primary cell in a dual connectivity (DC) system or a carrier aggregation (CA) system, and the integrity check module 802 is further configured to: if the user plane data fails the integrity check, transmit an integrity check failure notification message to the RRC layer, discard the user plane data; release the RRC connection with the network-side equipment or trigger the radio link failure (RLF) mechanism.

In some optional embodiments, the terminal operates in a secondary cell in a dual connectivity (DC) system or a carrier aggregation (CA) system, and the integrity check module 802 is further configured to: if the user plane data fails the integrity check, release the data radio bearer (DRB) configuration of the secondary cell or all secondary cells, or stop using the DRB of the secondary cell or all secondary cells.

In some optional embodiments, the terminal operates in a dual connectivity (DC) system and the network-side equipment acts as the secondary node (SN) in the DC system. The failure information transmission module 806 is configured to: if the user plane data fails the integrity check, transmit integrity check failure information to the master node (MN) in the DC system.

In some optional embodiments, the integrity check failure information includes the identifier of the network-side equipment.

In some optional embodiments, the terminal operates in a dual connectivity (DC) system, and the user-plane-data integrity check configuration information further includes third indication information configured to instruct the terminal to perform the integrity check on the received user plane data transmitted by another network-side equipment.

In some optional embodiments, the user-plane-data integrity check configuration information further includes fourth indication information configured to indicate the integrity check algorithm corresponding to the integrity check performed on the user plane data by the terminal.

The terminal provided by this embodiment may perform the method shown in the embodiment described above and has similar implementation principles and technical effects and will not be described again here in this embodiment.

Figure 10:
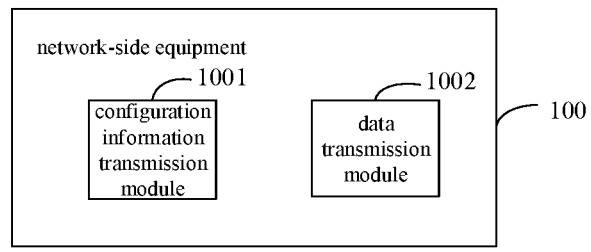
FIG. 10 is a schematic structural diagram of network-side equipment provided by an embodiment of the present disclosure.

FIG. 10 is a schematic structural diagram of network-side equipment provided by an embodiment of the present disclosure. As shown in FIG. 10, the network-side equipment 100 includes a configuration information transmission module 1001 and a data transmission module 1002.

The configuration information transmission module 1001 is configured to transmit user-plane-data integrity check configuration information to the terminal. The user-plane-data integrity check configuration information is configured to instruct the terminal to perform the integrity check on the user plane data received from the network-side equipment. The data transmission module 1002 is configured to transmit the user plane data to the terminal.

The user plane data is carried on the data radio bearer (DRB). The user-plane-data integrity check configuration information includes first indication information configured to indicate a DRB corresponding to the integrity check.

In some optional embodiments, the user-plane-data integrity check configuration information further includes a first determination criterion as to whether the user plane data fails the integrity check. The first determination criterion as to whether the user plane data fails the integrity check includes: if the user plane data carried on at least one of DRBs indicated by the first indication information fails the integrity check, then the user plane data fails the integrity check.

In some optional embodiments, that the user plane data carried on the DRB fails the integrity check includes: if at least one of data packets carried on the DRB fails the integrity check, then the user plane data carried on the DRB fails the integrity check; or if a ratio of the number of data packets carried on the DRB that fail the integrity check to the number of received data packets carried on the DRB exceeds a preset threshold, then the user plane data carried on the DRB fails the integrity check; or if the number of data packets carried on the DRB that fail the integrity check exceeds a preset number, then the user plane data carried on the DRB fails the integrity check; or if the number of data packets carried on the DRB that fail the integrity check exceeds a preset number in a preset duration, then the user plane data carried on the DRB fails the integrity check; or if the number of consecutive data packets carried on the DRB that fail the integrity check exceeds a preset number, then the user plane data carried on the DRB fails the integrity check.

In some optional embodiments, the user-plane-data integrity check configuration information includes second indication information configured to instruct the terminal to perform the integrity check on all the user plane data received.

In some optional embodiments, the user-plane-data integrity check configuration information further includes a second determination criterion as to whether the user plane data fails the integrity check. The second determination criterion as to whether the user plane data fails the integrity check includes: if at least one of data packets of the user plane data fails the integrity check, then the user plane data fails the integrity check; or if a ratio of the number of data packets of the user plane data that fail the integrity check to the number of received data packets exceeds a preset threshold, then the user plane data fails the integrity check; or if the number of data packets of the user plane data that fail the integrity check exceeds a preset number, then the user plane data fails the integrity check; or if the number of data packets of the user plane data that fail the integrity check exceeds a preset number in a preset duration, then the user plane data fails the integrity check; or if the number of consecutive data packets of the user plane data that fail the integrity check exceeds a preset number, then the user plane data fails the integrity check.

In some optional embodiments, the data packet includes protocol data unit (PDU) and/or service data unit (SDU) of a packet data convergence protocol (PDCP) layer, a radio link control (RLC) layer and/or a media access control (MAC) layer.

The network-side equipment provided by this embodiment may perform the method shown in the embodiment described above and has similar implementation principles and technical effects and will not be described again here in this embodiment.

Figure 11:
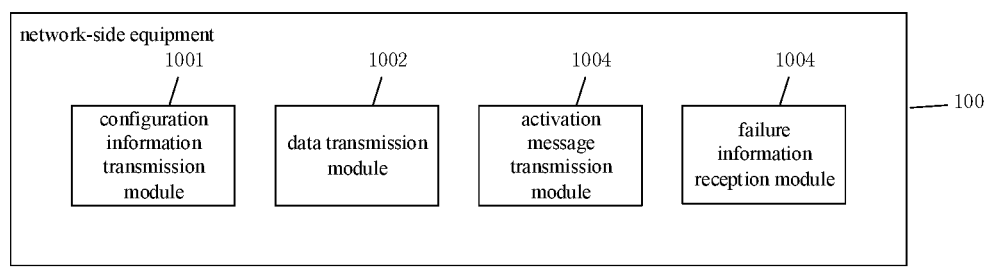
FIG. 11 is a schematic structural diagram of network-side equipment provided by an embodiment of the present disclosure.

FIG. 11 is a schematic structural diagram of network-side equipment provided by an embodiment of the present disclosure. As shown in FIG. 11, on the basis of the embodiment shown in FIG. 10, the network-side equipment in this embodiment further includes an activation message transmission module 1003 and a failure information reception module 1004. The activation message transmission module 1003 is configured to transmit a failure processing activation message to the terminal.

In some optional embodiments, the network-side equipment operates in a dual connectivity (DC) system and the network-side equipment acts as the master node (MN) in the DC system. The failure information reception module 1004 is configured to receive the integrity check failure information transmitted by the terminal. The integrity check failure information includes the identifier of the secondary node corresponding to the failure of the integrity check in the DC system.

In some optional embodiments, the network-side equipment operates in a dual connectivity (DC) system and the user-plane-data integrity check configuration information further includes third indication information configured to instruct the terminal to perform the integrity check on the received user plane data transmitted by another network-side equipment.

In some optional embodiments, the user-plane-data integrity check configuration information further includes fourth indication information configured to indicate the integrity check algorithm corresponding to the integrity check performed on the user plane data by the terminal.

The network-side equipment provided by this embodiment may perform the method shown in the embodiment described above and has similar implementation principles and technical effects and will not be described again here in this embodiment.

Figure 12:
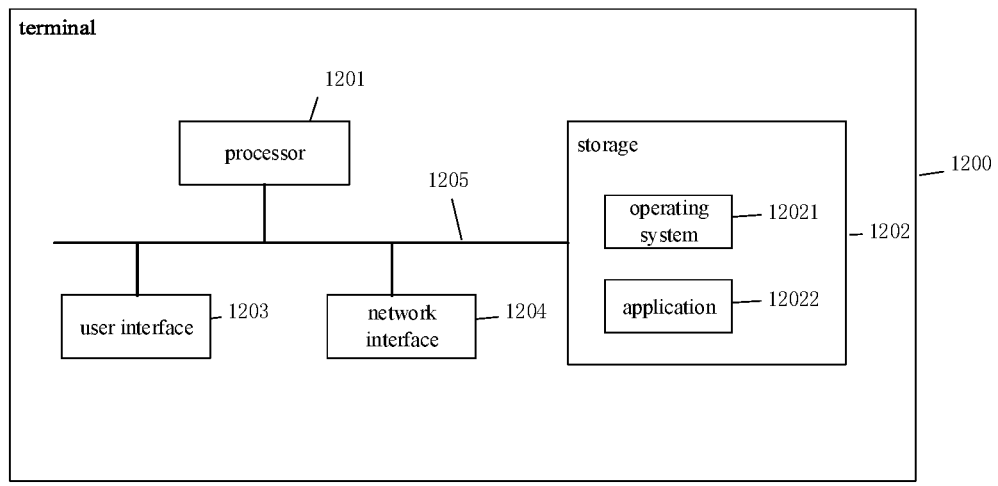
FIG. 12 is a schematic structural diagram of a terminal provided by another embodiment of the present disclosure.

FIG. 12 is a schematic structural diagram of a terminal provided by another embodiment of the present disclosure. As shown in FIG. 12, a terminal 1200 as shown in FIG. 12 includes: at least one processor 1201, a storage 1202, at least one network interface 1204, and a user interface 1203. Various components in the terminal 1200 are coupled to one another via a bus system 1205. It is appreciated that the bus system 1205 is configured to enable connection communication between these components. In addition to a data bus, the bus system 1205 also includes a power bus, a control bus, and a status signal bus. However, for the sake of clarity, all the buses are denoted collectively as the bus system 1205 in FIG. 11.

The user interface 1203 may include a display, a keyboard, or a clicking device such as a mouse, a trackball, a touch pad, or a touch screen and the like.

It is appreciated that the storage 1202 in embodiments of the present disclosure may be a volatile storage or a non-volatile storage, or may include both a volatile storage and a non-volatile storage. The non-volatile storage may be a read-only memory (ROM), a programmable ROM (PROM), an erasable PROM (EPROM), an electrically EPROM (EEPROM), or a flash memory. The volatile storage may be a random access memory (RAM) that acts as an external cache. By way of example and not limitation, many forms of RAM may be used, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM) and a direct rambus RAM (DRRAM). The storage 1202 in the system and method described in the embodiments of the present disclosure is intended to include, without being limited to, these and any other suitable types of storages.

In some embodiments, the storage 1202 stores the following elements, executable modules, or data structures, or the subsets thereof, or the extension sets thereof: an operating system 12021 and an application 12022.

The operating system 12021 includes various system programs, such as a framework layer program, a core library layer program, or a driver layer program and the like, and is configured to implement various basic services and handle hardware-based tasks. The application 12022 includes various applications, such as a media player, a browser, and the like, and is configured to implement various application services. Programs for implementing the method of the embodiments of the present disclosure may be included in the application 12022.

In an embodiment of the present disclosure, by calling programs or instructions stored in the storage 1202, specifically programs or instructions stored in the application 12022, the processor 1201 is configured to perform the integrity check on the user plane data transmitted by the network-side equipment based on the user-plane-data integrity check configuration information after the network interface 1204 receives the user plane data.

The method disclosed in the embodiments of the present disclosure described above may be applied to or implemented by the processor 1201. The processor 1201 may be an integrated circuit chip with signal processing capabilities. During implementation, various steps of the method described above may be achieved in form of hardware by integrated logical circuits in the processor 1201, or in form of software by instructions. The processor 1201 may be a general-purpose processor, a digital signal processor (DSP), an application specific integrated circuit (ASIC), a field programmable gate array (FPGA) or other programmable logic devices, discrete gates or transistor logic devices, or discrete hardware components. The methods, steps, and logical block diagrams disclosed in embodiments of the present disclosure may be implemented or performed. The general-purpose processor may be a micro-processor or the processor may be any conventional processor or the like. The steps of the method disclosed in connection with the embodiments of the present disclosure may be directly embodied in form of hardware by coding processor or implemented by the combination of hardware in the coding processor and software module. The software module may reside in a storage medium well-known in the art, such as a random access memory, a flash memory, a read-only memory, a programmable read-only memory or an electrically erasable programmable memory, or a register. The storage medium resides in the storage 1202, and the processor 1201 reads the information in the storage 1202 and completes the steps of the method described above in combination with hardware of the processor 1201.

It is appreciated that the embodiments described in the present disclosure may be implemented in hardware, software, firmware, middleware, microcode, or a combination thereof. For hardware implementation, the processing unit may be implemented in one or more application specific integrated circuits (ASIC), a digital signal processor (DSP), a DSP device (DSPD), a programmable logic device (PLD), a field-programmable gate array (FPGA), a general-purpose processor, a controller, a microcontroller, a microprocessor, other electronic units for performing the functions described in the present disclosure, or combinations thereof.

For software implementation, the techniques described in the embodiments of the present disclosure may be implemented by modules (e.g., processes, functions, etc.) that perform the functions described in the embodiments of the present disclosure. The software codes may be stored in a storage and executed by a processor. The storage may be implemented internal or external to the processor.

Specifically, the processor 1201 may call programs or instructions stored in the storage 1202 to execute the method performed by the terminal in the method embodiment described above. The implementation principles and technical effects are similar, and will not be described again here in this embodiment.

Figure 13:
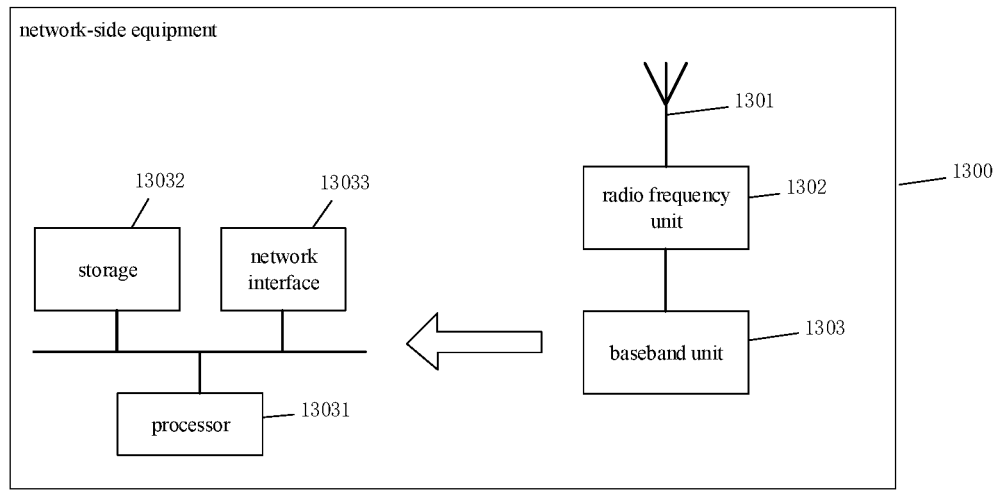
FIG. 13 is a schematic structural diagram of network-side equipment provided by another embodiment of the present disclosure.

FIG. 13 is a schematic structural diagram of network-side equipment provided by another embodiment of the present disclosure. As shown in FIG. 13, the network-side equipment 1300 includes an antenna 1301, a radio frequency unit 1302, and a baseband unit 1303. The antenna 1301 is connected to the radio frequency unit 1302. On the uplink direction, the radio frequency unit 1302 receives information via the antenna 1301 and transmits the information received to the baseband unit 1303 for processing. On the downlink direction, the baseband unit 1303 processes the information to be transmitted and transmits it to the radio frequency unit 1302. The radio frequency unit 1302 processes the received information and transmits it out via the antenna 1301.

The frequency band processing unit may reside in the baseband unit 1303. The method executed by the network-side equipment in the above embodiment may be implemented in the baseband unit 1303. The baseband unit 1303 includes a processor 13031 and a storage 13032.

The baseband unit 1303 may, for example, include at least one baseband processing board having multiple chips arranged thereon, as shown in FIG. 12. One of the chips is, for example, the processor 13031 that is connected to the storage 13032 to call the program in the storage 13032 so as to execute the operations of the network-side equipment shown in the above method embodiment.

The baseband unit 1303 may further include a network interface 13033 configured to exchange information with the radio frequency unit 1302. The interface is, for example, a common public radio interface (CPRI).

The processor herein may be one processor or refer to multiple processing elements collectively. For example, the processor may be a CPU, or may be an ASIC, or one or more integrated circuits configured to implement the method performed by the network-side equipment, such as one or more DSPs, or one or more FPGAs. The storage element may be one storage or may refer to multiple storage elements collectively.

The storage 13032 may be a volatile storage or a non-volatile storage, or may include both a volatile storage and a non-volatile storage. The non-volatile storage may be an ROM, a PROM, an EPROM, an EEPROM or a flash memory. The volatile storage may be an RAM and is used as an external cache. By way of example and without any limitation, various forms of RAMs are usable, such as an SRAM, a DRAM, a SDRAM, a DDRSDRAM, an ESDRAM, an SLDRAM, and a DRRAM. The storage 13032 described in the embodiments of the present disclosure intends to include, without limitation, these and any other suitable types of storages.

Specifically, the processor 13031 may call programs stored in the storage 13032 to execute the method performed by the network-side equipment in the embodiment described above. The implementation principles and technical effects are similar, and will not be described again here in this embodiment.

One of ordinary skills in the art may realize that the units and algorithm steps of the examples described in connection with the embodiments disclosed in the present disclosure may be implemented in electronic hardware, or a combination of computer software and electronic hardware. Whether these functions are implemented in hardware or software depends on the specific applications and design constraints of the technical solution. Skilled artisans may use different methods to implement the described function for each particular application, but such implementation should not be considered as departure from the scope of this disclosure.

Those skilled in the art may clearly understand that for the sake of convenience and conciseness of description, for the specific operating processes of the systems, apparatuses and units described above, a reference may be made to the corresponding processes in the method embodiments described above and a repeated description is omitted.

In the embodiments provided by the present disclosure, it is appreciated that the disclosed apparatuses and methods may be implemented in other ways. For example, the apparatus embodiments described above are only exemplary. For example, the units are divided merely in terms of their logic functions. In actual implementation, however, there may be other division methods. For example, multiple units or components may be combined or integrated into another system, or some features may be ignored or not implemented. In addition, the displayed or discussed mutual couplings or direct couplings or communication connections may be implemented through some interfaces. The indirect couplings or communication connections between the devices or units may be implemented in electrical, mechanical, or other forms.

The unit described as separate parts may be or may not be physically separated, and the parts shown as a unit may be or may not be a physical unit, i.e., they may be located in one place or may be distributed over multiple network units. Some or all of these units may be selected according to actual needs to achieve the purpose of the solution of the embodiment.

In addition, various functional units in the embodiments of the present disclosure may be integrated into one processing unit, or each of the units may exist alone physically. Alternatively, two or more functional units may be integrated into one unit.

If the functions are implemented in a form of a software functional unit and sold or used as an independent product, the functions may be stored in a computer-readable storage medium. Based on such an understanding, the technical solutions of this disclosure essentially, or the part contributing to the prior art, or a part of the technical solutions may be implemented in a form of a software product. The software product is stored in a storage medium, and includes several instructions for instructing a computer device (which may be a personal computer, a server, or a network equipment) to perform all or a part of the steps of the methods described in the embodiments of the disclosure. The foregoing storage medium includes any medium that can store program code, such as a universal serial bus (USB) flash drive, a removable hard disk, an ROM, an RAM, a magnetic disk, or an optical disc.

The aforementioned are merely specific implementations of the present disclosure, but the scope of the disclosure is by no means limited thereto. Any modifications or replacements that would easily occurred to those skilled in the art, without departing from the technical scope disclosed in the disclosure, should be encompassed in the scope of the present disclosure. Therefore, the scope of the present disclosure is to be determined by the scope of the claims.

As appreciated by one of ordinary skill in the art, all or some of the steps to implement the various method embodiments described above may be executed by hardware associated with program instructions. The aforementioned program may be stored in a computer-readable storage medium. The program, when executed, performs the steps of the method embodiments described above; and the aforementioned storage medium includes various media that may store program codes, such as an ROM, an RAM, a magnetic disk, or an optical disc.

Finally, it should be noted, the foregoing embodiments are only used to illustrate the technical solution of the embodiments of the present disclosure, and by no means constitute any limitation of the present disclosure; although detailed description of the present disclosure is provided with reference to the foregoing embodiments, it should be appreciated that modifications to the technical solution set forth in the embodiments or equivalent replacements of a part or all of the technical features may be made by one of ordinary skill in the art, and these modifications or replacements will not make essences of corresponding technical solutions to depart from the scope of the technical solutions of the embodiments of the present disclosure.

What is claimed is:

1. A method of integrity check, comprising:
receiving, by a terminal, user plane data transmitted by a network-side equipment;
performing, by the terminal, the integrity check on the user plane data based on user-plane-data integrity check configuration information,
wherein the terminal operates in a dual connectivity (DC) system;
wherein the user-plane-data integrity check configuration information further comprises third indication information;
the third indication information is configured to instruct the terminal to perform the integrity check on the received user plane data transmitted by another network-side equipment;
wherein before the performing, by the terminal, the integrity check on the user plane data based on the user-plane-data integrity check configuration information, the method further comprises:
receiving, by the terminal, the user-plane-data integrity check configuration information transmitted by the network-side equipment,
wherein the network-side equipment acts as a secondary node (SN) in the DC system;
after the performing, by the terminal, the integrity check on the user plane data based on the user-plane-data integrity check configuration information, the method further comprises:
in case that the user plane data fails the integrity check, transmitting, by the terminal, integrity check failure information to a master node (MN) in the DC system.

2. The method according to claim 1, wherein the user plane data is carried on at least one data radio bearer (DRB);
the user-plane-data integrity check configuration information comprises first indication information configured to indicate performing the integrity check on user plane data carried on a DRB of the at least one DRB on which the integrity check requires to be performed;
the performing, by the terminal, the integrity check on the user plane data based on the user-plane-data integrity check configuration information comprises:
performing, by the terminal, the integrity check on the user plane data carried on the DRB indicated by the first indication information;
or,
wherein the user-plane-data integrity check configuration information comprises second indication information configured to instruct the terminal to perform integrity check on all the user plane data received;
the performing, by the terminal, the integrity check on the user plane data based on the user-plane-data integrity check configuration information comprises:
performing, by the terminal, the integrity check on all the user plane data received by the terminal based on the second indication information.

3. The method according to claim 2, wherein the performing, by the terminal, the integrity check on the user plane data carried on the DRB indicated by the first indication information comprises:
in case that the user plane data carried on at least one of DRB s indicated by the first indication information fails the integrity check, determining, by the terminal, that the user plane data fails the integrity check.

4. The method according to claim 3, wherein the determining, by the terminal, that the user plane data carried on the DRB fails the integrity check comprises:
in case that at least one of data packets carried on the DRB fails the integrity check, determining, by the terminal, that the user plane data carried on the DRB fails the integrity check; or
in case that a ratio of the number of data packets carried on the DRB that fail the integrity check to the number of received data packets carried on the DRB exceeds a preset threshold, determining, by the terminal, that the user plane data carried on the DRB fails the integrity check; or
in case that the number of data packets carried on the DRB that fail the integrity check exceeds a preset number, determining, by the terminal, that the user plane data carried on the DRB fails the integrity check; or
in case that the number of data packets carried on the DRB that fail the integrity check exceeds a preset number in a preset duration, determining, by the terminal, that the user plane data carried on the DRB fails the integrity check; or
in case that the number of consecutive data packets carried on the DRB that fail the integrity check exceeds a preset number, determining, by the terminal, that the user plane data carried on the DRB fails the integrity check.

5. The method according to claim 1, wherein, after the performing, by the terminal, the integrity check on the user plane data based on the user-plane-data integrity check configuration information, the method further comprises:
in case that the user plane data fails the integrity check, performing, by the terminal, at least one of the following steps:
transmitting, by a PDCP layer of the terminal, an integrity check failure notification message to a radio resource control (RRC) layer of the terminal;
discarding, by the terminal, the user plane data;
transmitting, by the terminal, the integrity check failure notification message to the network-side equipment;
releasing, by the terminal, an RRC connection with the network-side equipment;
triggering, by the terminal, a radio link failure (RLF) mechanism;
releasing, by the terminal, a data radio bearer (DRB) configuration of the network-side equipment.

6. The method according to claim 5, wherein, before the performing, by the terminal, the integrity check on the user plane data based on the user-plane-data integrity check configuration information, the method further comprises:
receiving, by the terminal, a failure processing activation message transmitted by the network-side equipment.

7. The method according to claim 1, wherein the user-plane-data integrity check configuration information further comprises fourth indication information;

the fourth indication information is configured to indicate an integrity check algorithm corresponding to the integrity check performed on the user plane data by the terminal.

8. The method according to claim 1, wherein the in case that the user plane data fails the integrity check, transmitting, by the terminal, integrity check failure information to the MN in the DC system, comprises:

transmitting, by the terminal, the integrity check failure information with an identifier of the SN to the MN, rather than transmitting the integrity check failure information to the SN, to instruct the MN to disconnect from the SN and re-establish a connection with a new SN.

9. A terminal, comprising: a processor; a storage; and a computer program stored in the storage and configured to be executed by the processor, wherein the processor is configured to execute the computer program, to implement the following steps:

receiving user plane data transmitted by a network-side equipment;

performing integrity check on the user plane data based on user-plane-data integrity check configuration information, wherein, before the performing the integrity check on the user plane data based on the user-plane-data integrity check configuration information, the processor is further configured to execute the computer program to implement: receiving the user-plane-data integrity check configuration information transmitted by the network-side equipment, wherein the terminal operates in a dual connectivity (DC) system and the network-side equipment acts as a secondary node (SN) in the DC system;

after the performing the integrity check on the user plane data based on the user-plane-data integrity check configuration information, the processor is further configured to execute the computer program to implement: transmitting integrity check failure information to a master node (MN) in the DC system in case that the user plane data fails the integrity check;

wherein the user-plane-data integrity check configuration information further comprises third indication information;

the third indication information is configured to instruct the terminal to perform the integrity check on the received user plane data transmitted by another network-side equipment.

10. The terminal according to claim 9, wherein the user plane data is carried on at least one data radio bearer (DRB);

the user-plane-data integrity check configuration information comprises first indication information configured to indicate performing the integrity check on user plane data carried on a DRB of the at least one DRB on which the integrity check requires to be performed;

the performing the integrity check on the user plane data based on the user-plane-data integrity check configuration information comprises: performing the integrity check on the user plane data carried on the DRB indicated by the first indication information;

or, wherein the user-plane-data integrity check configuration information comprises second indication information configured to instruct the terminal to perform integrity check on all the user plane data received;

the performing the integrity check on the user plane data based on the user-plane-data integrity check configuration information comprises: performing the integrity check on all the user plane data received by the terminal based on the second indication information.

11. The terminal according to claim 10, wherein the performing the integrity check on the user plane data carried on the DRB indicated by the first indication information comprises:

in case that the user plane data carried on at least one of DRBs indicated by the first indication information fails the integrity check, determining that the user plane data fails the integrity check.

* * * * *